Oct. 3, 1933.　　　　P. F. BOEYE　　　　1,928,660
BOX
Filed Jan. 24, 1931　　　2 Sheets-Sheet 1

Inventor
Paul F. Boeye
By Caswell & Sagaard
Attorneys

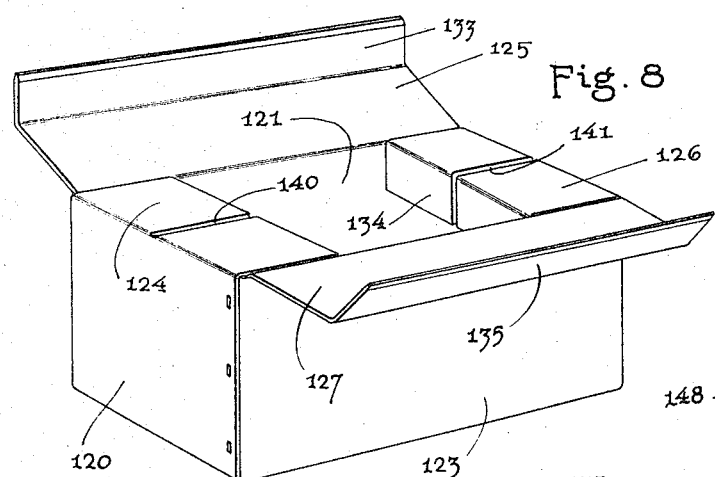

Patented Oct. 3, 1933

1,928,660

UNITED STATES PATENT OFFICE 1,928,660

BOX

Paul F. Boeye, St. Paul, Minn., assignor to Waldorf Paper Products Company, St. Paul, Minn., a corporation of Minnesota Application January 24, 1931. Serial No. 510,968

7 Claims. (Cl. 229—15).

My invention relates to boxes and particularly to boxes formed with side and end walls and having flaps bent outwardly therefrom and adapted to be disposed in overlying position to form upper and lower closures for the box.

An object of the invention resides in forming two of the flaps with co-planar slots and in forming the other two of the flaps with the meeting tabs adapted to be bent inwardly therefrom and to be received within said slots.

A feature of the invention resides in the application of an adhesive to the meeting tabs of the box for securing the same together to form a rigid closure for the box.

A still further object of the invention resides in forming the slots in said first named flaps of a width less than the combined thickness of said tabs to urge the tabs against one another and to hold the tabs in contacting relation during the setting of the adhesive applied thereto.

Another object of the invention resides in reducing the thickness of the tabs at the free edges thereof to permit of readily inserting the same within said slots.

An object of the invention resides in bending the edges of the flaps along said slots inwardly to form wedge shaped openings for the reception of the meeting tabs on the second named flaps, serving to guide the tabs into the slots and to urge the same against one another.

Another object of the invention resides in constructing the box with corresponding tabs and flaps on both the upper and lower portions thereof and in running the slots on the two portions at right angles to one another to stiffen and reinforce the box.

A still further object of the invention resides in spacing two of the sets of tabs from one another.

A feature of the invention resides in employing within the box, a separator disposed between said last named tabs to increase the number of compartments within the same.

An object of the invention resides in constructing the separator with a portion forming a partition and with other portions forming bases adapted to rest against the side wall flaps and to abut against the end wall tabs.

Other objects of the invention reside in the novel combination and arrangement of parts and in the details of construction hereinafter illustrated and/or described.

In the drawings:

Fig. 7 is a perspective view of another form of box illustrating the same in closed position.

Fig. 8 is a perspective view of the box shown in Fig. 7 with certain of the flaps thereof in open position.

Fig. 9 is a developed view of the blank from which the box shown in Figs 7 and 8 is constructed.

Fig. 10 is a longitudinal sectional view taken on line 10—10 of Fig. 7.

Fig. 11 is a cross sectional view taken on line 11—11 of Fig. 10.

Fig. 12 is a perspective view of a divider used with the form of the invention shown in Figs. 7 to 11.

Figure 1:
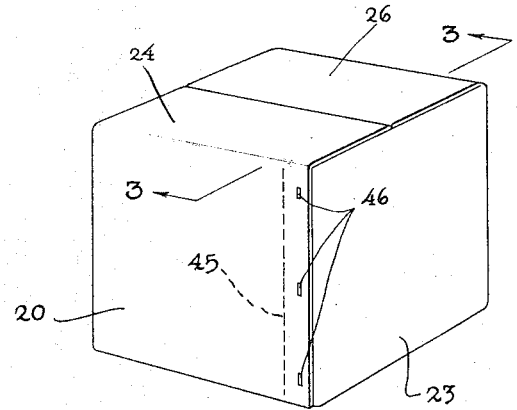
Fig. 1 is a perspective view of a box in closed position illustrating an embodiment of my invention.
Figure 3:
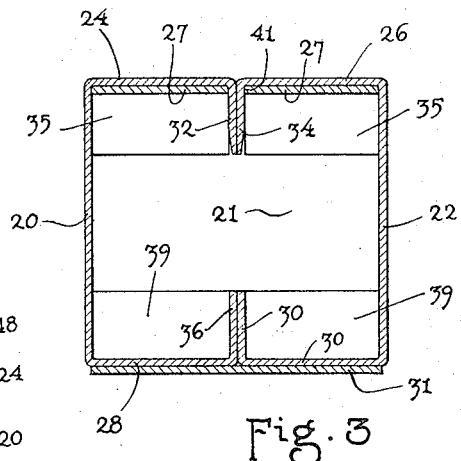
Fig. 3 is a longitudinal sectional view of the box taken on line 3—3 of Fig. 1.
Figure 2:
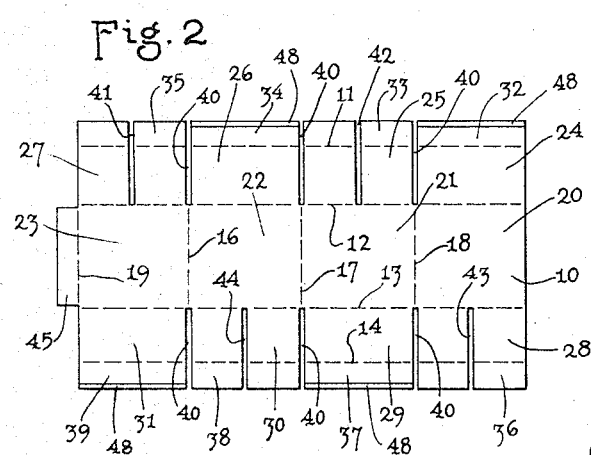
Fig. 2 is a developed view of the blank from which the box shown in Fig. 1 is constructed.

In the form of the invention shown in Fig. 1, a box is provided which is extremely rigid and substantial in construction and by means of which a number of compartments may be formed within the same and with a minimum amount of material. This box is constructed from a blank, indicated in its entirety at 10, (Fig. 2), which is formed with four longitudinal score lines 11, 12, 13 and 14, extending in a parallel relation through the length thereof. The blank is further formed with transverse score lines 16, 17, 18 and 19, which divide the box into side walls 20 and 22 and into end walls 21 and 23. The box is formed along the various score lines 16, 17 and 18 with slots 40, which extend from edges of the blank up to the score lines 12 and 13. These slots, together with the score lines, above referred to, further divide the box into upper flaps 24 and 26, issuing from the end walls 20 and 22 and flaps 25 and 27 issuing outwardly from the side walls 21 and 23. In like manner, the lower portion of the box is divided into lower flaps 28 and 30, issuing outwardly from the end walls 20 and 22 and flaps 29 and 31 issuing outwardly from the side walls 21 and 23. The score lines 11 and 14 form at the ends of the various flaps 24, 25, 26, 27, 28, 29, 30 and 31, tabs 32, 33, 34, 35, 36, 37, 38, and 39. Through the design of the box and the proper spacing of the various score lines, the various tabs above referred to are adapted to meet one another at the center of the box when the flaps are folded into closing position, as shown in Figs. 1 and 3.

Along the flaps 25 and 27 and the corresponding tabs 33 and 35 formed thereon, are provided centrally disposed slots 40, 41 and 42, which extend from the edges of said tabs up to the score line 12. In like manner, on the flaps 28 and 30 and the tabs 36 and 38 are formed similar slots 43 and 44, which extend from the edges of said tabs up to the score line 13. These slots are adapted to receive the tabs 32, 34, 37 and 39, as illustrated in Fig. 3, to form two intersecting dividers within the box when the flaps of the box are folded into closing position.

The blank 10 is formed with a flap 45 extending along the free edge of the end wall 23 which is adapted to be bent outwardly therefrom along a score line 19. In the construction of the box at the factory, this flap is secured to the side wall 20 through a number of staples 46 or the said parts may be attached together through gluing or in any other suitable manner. The box with the flaps and tabs in co-planar relation with the walls from which they issue, may be collapsed by folding the same along diagonal corners into a planiform state. When so disposed, the box occupies a minimum amount of space and may be baled for storage or shipment prior to use.

Figure 5:
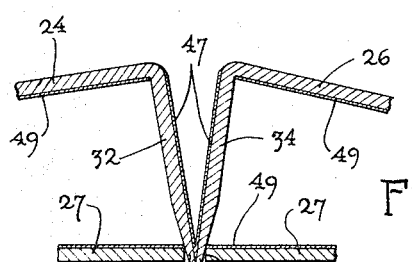
Fig. 5 is a view similar to Fig. 4, showing the method of inserting the tabs within the receiving slots.
Figure 4:
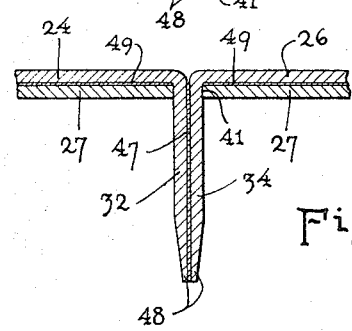
Fig. 4 is a sectional detail view of a portion of the structure shown in Fig. 3, drawn to a larger scale and illustrating the meeting tabs in closed position.

The erection of the box is accomplished as follows: Either end of the box may be used as the bottom, since both are identical. In Figs. 4 and 5, the method of closing the upper end of the box has been illustrated and will now be described, though it can readily be comprehended that the end desired for the bottom is first closed. In erection, the sides of the box are first folded into rectangular form. The tabs 33 and 35 are then bent inwardly along the score line 12 and the flaps 25 and 27, from which these tabs issue, bent into the plane of the bottom of the box. The tabs 32 and 34 are next bent inwardly and the corresponding flaps 24 and 26 bent into the plane of the box. During the latter operation, the tabs 32 and 34 are inserted within the slots 41 and 42 which lie in co-planar relation when the flaps 25 and 27 are in closing position. For the purpose of sealing the box and forming a rigid construction, an adhesive is applied to the facing surfaces of the flaps 24, 25, 26 and 27, as indicated at 49 and also to the facing surfaces of the tabs 32 and 34, as indicated at 47 in Fig. 5, which adhesive serves to cement said flaps and the two tabs 32 and 34 together. For the purpose of holding the coated parts in contact with one another, the extreme edges 48 of the various tabs 32, 34, 37 and 39 are reduced in thickness and the slots 41, 42, 43 and 44 are constructed of a width less than the combined thickness of the complemental tabs to be received within the same. The thickness of the edges 48 of the various tabs may be reduced by skiving or otherwise and where a compressible material is used, such as corrugated board, by crushing the same. Due to the reduction in thickness of the extreme ends of the complemental tabs, the same may be readily received within the slots and when so disposed, are urged toward one another to cause the coated parts 47 thereof to come in contact and to be cemented together. At the same time the tabs 32 and 34 are restrained from movement along the slots, thereby holding the flaps in contact with one another. In this manner, both the flaps and tabs are rigidly held while the adhesive is setting, so that the closure is securely sealed. After the bottom of the box has been formed, the contents of the same are placed within the box and between the sets of tabs which form dividers for holding the contents apart and form compartments for the reception of the same. After the contents have been placed within the box, the flaps of the top of the box may be likewise folded into place and the corresponding tabs inserted within the slots provided for the purpose. In like manner, adhesive may be applied to the surfaces of the flaps and tabs to cause the same to be cemented together thereby completely sealing the box and thereby forming an extremely rigid box construction.

Figure 6:
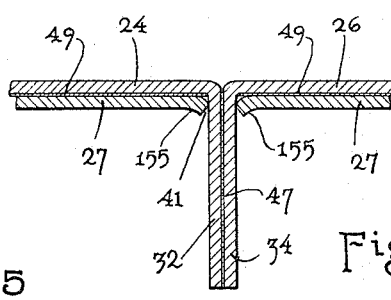
Fig. 6 is a view similar to Fig. 4, showing a modification of the invention.

In Fig. 6 I have shown another construction for holding the tabs 32 and 34 in engagement with one another. In this case the material of the tabs 25 and 27 along the slots 41 and 42 is bent inwardly as indicated at 155 to form said slots V-shaped. The tabs 32 and 34 may be of uniform thickness and when inserted within said slots are wedged against one another to maintain contact through the setting of the adhesive thereon.

In Figs. 7 to 11, I have shown another form of the invention which differs somewhat from that shown in Fig. 1, in that eight compartments may be formed within the box instead of four as shown in Fig. 1. This box is constructed from a blank 110, which is formed with four longitudinal score lines 111, 112, 113 and 114, parallel with one another and with the longitudinal edges of the blank. The blank is further constructed with four transverse score lines 116, 117, 118 and 119. These score lines divide the box into end walls 120 and 122 and into side walls 121 and 123. The blank 110 is formed with slots or cuts 140 along the score lines 116, 117, and 118, which extend from the free edges of the blank up to the score lines 112 and 113. These slots, together with the other score lines form flaps 124, 125, 126 and 127, which extend outwardly from the corresponding walls 120, 121, 122 and 123, along their upper edges. In like manner, flaps 128, 129, 130 and 131 are formed on the corresponding lower edges of said walls. The score lines 111 and 114 form at the extreme ends of the various flaps, a number of tabs 132, 133, 134, 135, 136, 137, 138 and 139, which correspond with the similar tabs on the other form of the box. The blank 110 is folded along the score lines 119, 116, 117 and 118, and the walls 120 and 123 secured together through a flap 145, the same as in the other form of the invention. It is to be noted however, that the various walls and flaps of the box constructed from the blank 110, are such that when the various flaps and tabs are folded into closing position, the tabs 134 and 132 and the complemental tabs 136 and 138 become spaced from one another a distance equal to twice the distance between said tabs and the corresponding end walls 120 and 122. At the same time, the parts are so proportioned that the tabs 133 and 135 and the tabs 137 and 139 meet one another medially of the box. For the reception of the tabs 133, 135, 137 and 139, the flaps 124, 126, 128 and 130 are formed with slots 141, 142, 143 and 144. These slots extend from the free edges of the tabs through said tabs and flaps and up to score lines 112 and 113.

Within the interior of the box illustrated in Figs. 7 to 11, is placed a separator 153, which is shown in detail in Fig. 12. This separator is constructed from the same or a similar material as the box and is formed with a portion 154, which forms a partition and with two base portions 147 and 148. This partition is adapted to rest upon the flaps 125, 127, 129 and 131 with the edges of the bases 148 and 149 thereof abutting against the edges of the tabs 134 and 136. For the reception of the tabs 133, 135, 137 and 139, the partition 154 and the bases 147 and 148 are constructed with co-planar slots 150, which extend completely through said bases and partly through the partition proper.

The box shown in Figs. 7 to 12 is erected in much the same manner as the other form of box. The bottom is first assembled and the tabs 137 and 139 glued together. The separator 153 is next inserted within the box and the articles to be placed within the box are disposed within the various compartments formed by said separator and the tabs on the various flaps. The flaps forming the closure are then folded in place with the tabs thereon inserted between the respective articles and the same glued together as previously described. In order to make all of the compartments within the box of the same height, two fillers 151 and 152 are employed which are placed adjacent the flaps 125, 127, 129 and 131 and between the partition 154 of the separator 153 and the adjacent tab and on the sides of said partition opposite the respective bases 147 and 148. These fillers, besides filling in the space opposite the bases on the separator, assist in holding said separator in place within the box.

The advantages of my invention are manifest. An extremely strong and rigid box is provided in which goods may be packed for shipment and in which the goods or articles disposed therein are held apart. The box is constructed from a minimum amount of stock and without waste, so that the same may be sold at a reasonable price. Weakening of the box on account of the slots through the closure flaps is greatly reduced, due to the disposition of these slots at right angles to one another. By the formation of the box so that the meeting tabs of the closure flaps are forced and held against one another, the same may be glued and attached to one another without being held by the user. At the same time, the snug engagement of the adjoining portions of the box with the meeting tabs, makes the box much more rigid than would be the case were the tabs loosely fitting within the slots and prevents weaving of the same. A box constructed in accordance with my invention may be readily formed to provide eight compartments instead of four without materially adding to the expense of the box and without weakening the same.

Changes in the specific form of my invention as herein disclosed may be made within the scope of what is claimed, without departing from the spirit of my invention.

Having described my invention, what I claim as new and desire to protect by Letters Patent is:

1. A box comprising side walls and end walls, flaps bent outwardly from two of the opposite walls thereof, said flaps having co-planar slots extending through the same, flaps bent outwardly from the two other walls of the box, tabs on said second named flaps, said tabs meeting one another when the flaps to which they are attached are folded into closing position and being insertable into said slots to form article engaging means within the box, the meeting edges of said tabs being adapted to be coated with an adhesive for attaching said tabs to one another, said slots being of a width less than the combined thickness of said tabs, to force said tabs together when inserted into said slots and to hold the coated portions thereof in contact during the setting of the adhesive on the same.

2. A box formed of a flexible material, comprising side walls and end walls, flaps bent outwardly from two of the opposite walls thereof, said flaps having co-planar slots extending through the same, flaps bent outwardly from the two other walls of the box, tabs on said second named flaps, said tabs meeting one another when the flaps to which they are attached are folded into closing position and being insertable into said slots to form article engaging means within the box, the meeting edges of said tabs being reduced in thickness to guide said tabs within said slots, said slots being of a width less than the combined thickness of said tabs to urge the same into engagement with one another.

3. A box comprising side walls and end walls, flaps bent outwardly from the upper edges of the end walls of said box, said flaps having co-planar slots therein, flaps bent outwardly from the upper edges of the side walls of said box, tabs bent inwardly from the free ends of said flaps, said tabs meeting one another medially of the side walls of the box to form a divider therein and being received within said slots, flaps bent outwardly from the lower edges of the side walls of the box, said flaps having co-planar slots therein, disposed at right angles to the slots in said first named flaps, other flaps bent outwardly from the lower edges of the end walls of the box, said flaps having tabs bent inwardly therefrom and adapted to meet medially of the end walls of the box to form article engaging means within the same, said second named flaps being adapted to be received within said second named slots.

4. A box comprising side walls and end walls, flaps bent outwardly from the side walls of the box, tabs bent inwardly from said flaps and falling short of one another when said flaps are folded into closing position a distance substantially twice the distance between said tabs and end walls, said flaps and tabs having co-planar slots, flaps bent outwardly from the side walls of the box, said flaps having tabs bent inwardly therefrom and adapted to meet one another medially of the sides of the box, to form article engaging means within the box, said tabs being adapted to be received within said slots and a Z-shaped separator having a portion forming a partition and base portions connected therewith, said base portions and the upper and lower ends of said partition being constructed with co-planar slots adapted to receive said second named tabs, said base portions resting against said second named flaps and the edges thereof abutting against two of said first named tabs.

5. A box formed of a compressible material, comprising side walls and end walls, flaps bent outwardly from two of the opposite walls thereof and said flaps having co-planar slots extending through the same, flaps bent outwardly from the two other walls of the box, tabs on said second named flaps, said tabs meeting one another when the flaps to which they are attached are folded into closing position and being insertable into said slots to form article engaging means within the box, the meeting edges of said second named tabs being crushed to reduce the thickness thereof for guiding said tabs into said slots, said slots being of a width less than the combined thickness of said tabs to urge the same into engagement with one another.

6. A box comprising side and end walls, flaps bent outwardly from said side and end walls to form closures for the box, two of the oppositely extending flaps being shorter to leave offset spaces between flaps across the closures of the box and a Z-shaped separator having a portion forming a partition, and base portions connected therewith, said base portions being received within the offset spaces formed by said flaps.

7. A box formed of flexible material comprising a closure including flaps having slots extending through the same, other flaps adapted to overlie said first named flaps, tabs on said second named flaps, said tabs meeting one another when in overlying position and being insertable into said slots to form article engaging means within the box, the meeting edges of said tabs being reduced in thickness to guide said tabs into said slots, the meeting edges of said tabs being adapted to be coated with an adhesive for attaching said tabs to one another, said slots being of a width less than the combined thickness of said tabs, to urge the tabs into engagement with one another and to hold the coated portions thereof in contact during the setting of the adhesive on the same.

PAUL F. BOEYE.